M. SCHIEBENDREIN.
WHEAT SCOURING MACHINE.
APPLICATION FILED MAR. 10, 1909.
944,510.
Patented Dec. 28, 1909.
2 SHEETS—SHEET 1.
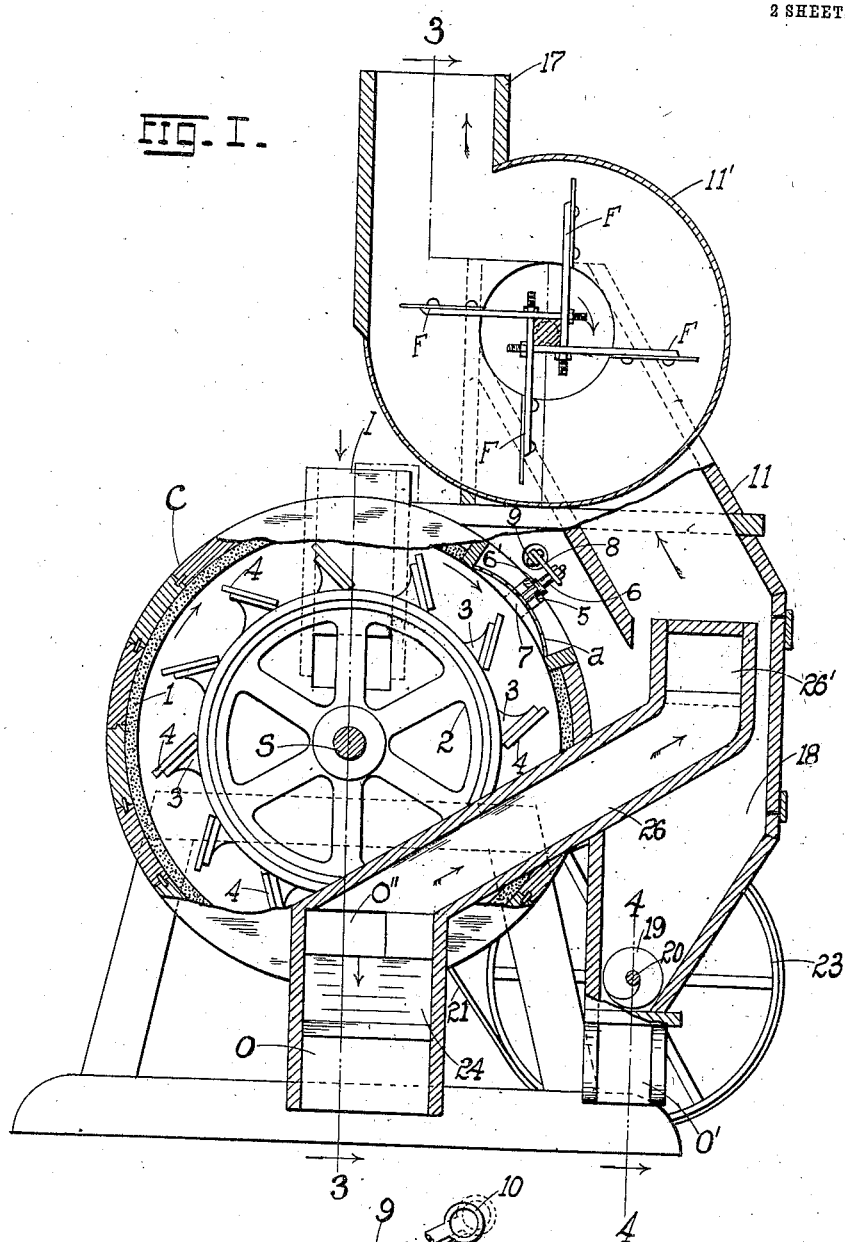
WITNESSES:
Harry A. Beines
Fannie E. Weber
INVENTOR.
Matyas Schiebendrein.
BY
ATTORNEY.

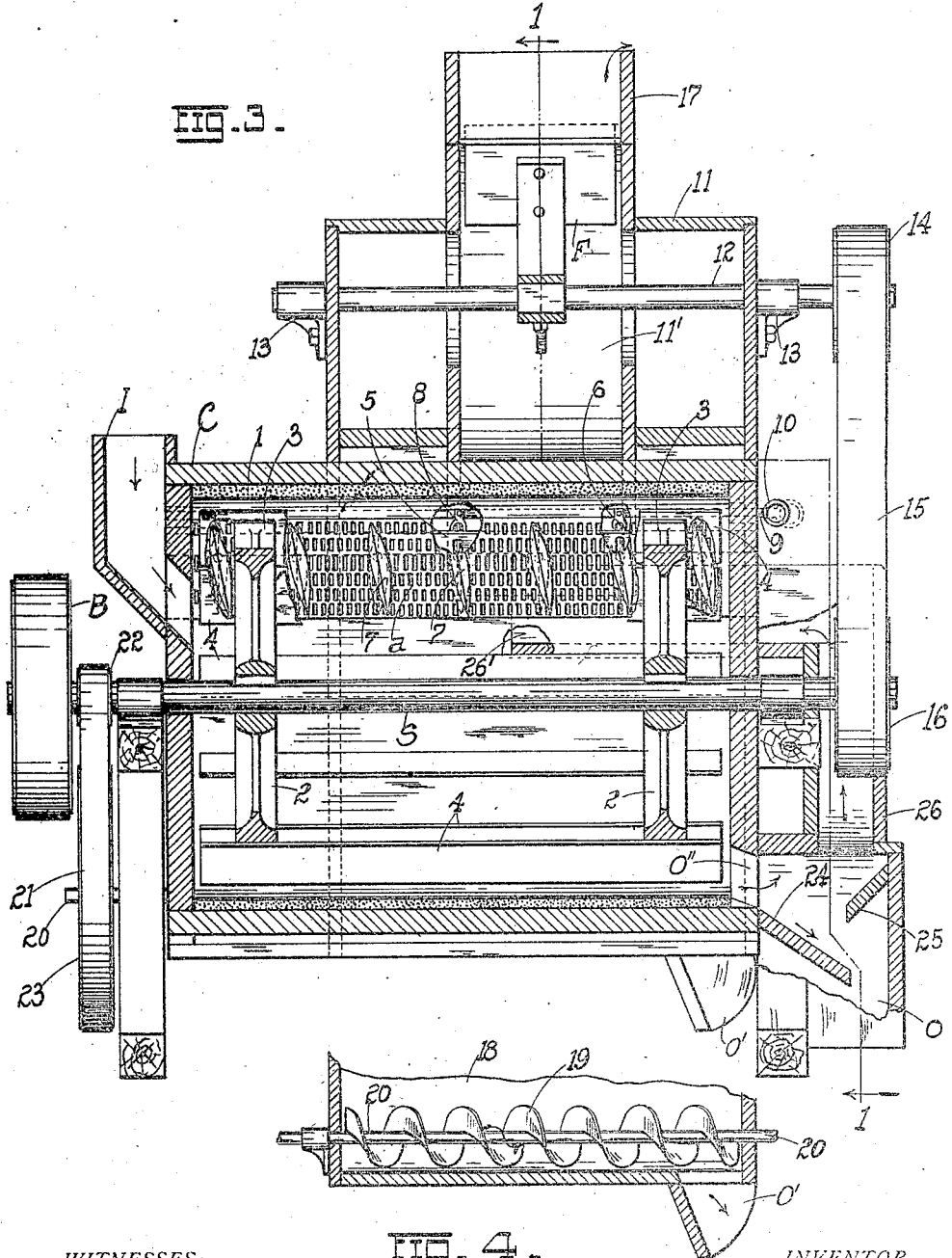

UNITED STATES PATENT OFFICE.

MATYAS SCHIEBENDREIN, OF ST. LOUIS, MISSOURI.

WHEAT-SCOURING MACHINE.

944,510.  Specification of Letters Patent.  Patented Dec. 28, 1909.

Application filed March 10, 1909. Serial No. 482,525.

*To all whom it may concern:*

Be it known that I, MATYAS SCHIEBENDREIN, a subject of the Emperor of Austria-Hungary, residing at St. Louis, State of Missouri, have invented certain new and useful Improvements in Wheat-Scouring Machines, of which the following is a full, clear, and exact description, reference being had to the accompanying drawings, forming a part hereof.

My invention has relation to improvements in wheat scouring machines; and it consists in the novel construction and arrangement of parts more fully set forth in the specification and pointed out in the claims.

In the drawings, Figure 1 is a vertical transverse section on the broken line 1—1 of Fig. 3; Fig. 2 is a perspective detail of one of the series of deflecting ribs and the controlling bar attached thereto; Fig. 3 is a vertical longitudinal section on line 3—3 of Fig. 1; and Fig. 4 is a sectional detail on line 4—4 of Fig. 1 showing the conveyer for removing the heavy particles of the impurities.

The object of my invention is to construct a machine which will effectively scour wheat as it leaves the separator and prior to its introduction into the milling machine, thereby removing all foreign particles and impurities adhering thereto such as beards, hulls, dust and the like, the grain thus scoured when ground resulting in a flour of superior quality and whiteness. The invention in detail may be described as follows:—

Referring to the drawings, C represents an outer cylindrical stationary casing or drum, provided with an inner lining of carborundum 1 or of equivalent hard material which can stand considerable wear. Disposed axially through the casing is a shaft S, driven by a belt-pulley B, the shaft having secured thereto, at opposite ends within the casing, the heads or disks 2, 2, which are provided with tangentially disposed brackets or arms 3, 3, arranged opposite one another, each pair of brackets having secured thereto the longitudinally disposed plates or beaters 4. The casing is provided at one end above the shaft S with an inlet chute I, and at the opposite end below the shaft with an outlet chute O. The casing C and its lining 1 have a section thereof removed, the opening thus left being covered by a perforated plate or sieve *a* convexed outwardly (Fig. 1), there being secured above the sieve a longitudinally disposed bar 5, whose opposite ends are fastened in any mechanical manner to the heads of the casing or cylinder C. Through the supporting bar 5 are passed the cylindrical rock-stems 6, of a series of crescent shaped deflectors 7, lying close against the inner surface of the sieve *a*, each stem 6 being provided with a collar 6' to insure support therefor on the bar 5. To the outer reduced end of each rock-stem 6 is secured an arm 8, the several arms being connected to a common controlling link or rod 9, one end of which passes freely through the head or end of the casing C and terminates in a loop or handle 10, as shown.

Mounted above the casing C is an extension 11, with which is formed the central enlarged fan casing 11' for the blades or fan F, the shaft 12 of the latter being mounted in brackets 13, 13, bolted to the sides of the extension 11. The fan-shaft 12 is provided at one end with a pulley 14, from which runs a belt 15, the latter passing over a pulley 16, on the main drive shaft C. Leading from the fan casing is an exit flue 17. The walls of the extension 11 incline to meet the walls of the dust compartment 18, the lower end of which tapers into the form of a hopper (Fig. 1) to catch the heavy particles of the impurities, the base of said hopper being provided with a spiral conveyer 19, the shaft 20 of which is driven by a belt 21 passing over the pulleys 22 and 23, carried by the shafts S and 20 respectively. The spiral conveyer discharges its material through the chute O'. The scoured wheat in approaching the outlet O, passes over a ledge 24, below the baffle plate or wall 25, the wheat passing onto the ledge through the opening O'' formed in the rear wall of the outlet flue O which latter constitutes the lower terminal of the inclined flue 26. The upper terminal of the flue 26 takes the form of a longitudinally disposed flue or extension 26', which discharges into the chamber 18 at the base of the casing 11, approximately below the fan F. (Fig. 3.)

The operation of the machine may be described as follows:—Rotation being imparted to the drive-shaft S, the fan F and the conveyer 19 will be driven through the belt connections described. The wheat is dumped or fed in at the inlet end I, whereupon the rotating beaters or blades 4 will rub the same against the surface of the carborundum lining 1, the length of time the grain remains in the cylinder C depending on the angular disposition of the deflectors or ribs 7, relative to the axis of the cylinder. The operator, by seizing the handle 10 of the rod 9, can rock the several stems 6 about their axes so as to set the deflectors 7 to any angle; and that angle determines the rate at which the grain is advanced from the feed to the discharge end of the cylinder. By increasing or decreasing said angle the rate of discharge will be accordingly more or less rapid. As the grain is thus carried around between the beaters or blades 4 and the lining 1, the chaff, straw, beards, and other impurities become separated from the grain, and broken up sufficiently to pass through the reticulated or perforated plate or sieve $a$, (which by the way may be made of woven wire) and is drawn up by the suction of the fan through the compartment 11, and through the fan casing, and out through the exit flue 17, the cleansed and scoured wheat dropping through the opening O'' onto the ledge 24, thence through the discharge mouth or outlet O, where it is caught in any suitable receptacle (not shown). As the scoured wheat thus travels along the ledge 24, any light particles accompanying the same will be drawn up through the flue 26, 26' into the fan casing and out; and finally such particles as escape the rising air currents by reason of increased weight of the particles will drop down to the bottom of the compartment 18 whence they are discharged by the spiral conveyer 19 toward and into the chute O' and disposed of in any suitable manner. By disposing the blades or beaters 4 tangentially as shown, the grain is projected more efficiently against the lining 1, and thus undergoes an attrition or rubbing which it would receive less effectively were the blades disposed radially. Besides, in a tangential disposition, each blade serves to support the grain through a greater angle of rotation before dropping it than would be the case were the blades set radially. The machine, while primarily designed to scour wheat, may of course be used for cleaning and scouring any kind of grain whatsoever.

Having described my invention, what I claim is:—

1. In a grain scouring machine, a suitable cylindrical casing having an inlet and an outlet, and having a portion of its peripheral wall removed, a reticulated plate or sieve mounted in the opening left by said removed portion and curved in the arc of the cross-section of the inner surface of the casing, a rotating member confined within the casing, a series of tangentially disposed beaters on said member for scouring the grain, a series of adjustable ribs distributed along the inner surface of the sieve and curved to conform with the cylinder walls, and means for adjusting the angular disposition of the ribs relatively to the axis of the casing, whereby the grain is advanced at any predetermined rate of speed toward the outlet.

2. In a grain scouring machine, a suitable cylindrical casing having an inlet and an outlet, and having a portion of its peripheral wall removed, a reticulated plate or sieve mounted in the opening left by said removed portion and curved in the arc of the cross-section of the inner surface of the casing, a series of rotating tangentially disposed blades operating in proximity to the inner surface of the casing, a series of adjustable ribs distributed along the inner surface of the sieve and curved to conform with the cylinder walls, rock-stems connected to the centers of the ribs, a longitudinally disposed bar for supporting the stems, arms on the stems, a link or rod pivotally connected to the several arms, a suction fan or exhaust for removing the light impurities separated from the grain through the sieve and from the point of the charge from the casing, and an intermediate compartment between the exhaust and the point of discharge through which the impurities pass on their way to the exhaust.

In testimony whereof I affix my signature, in presence of two witnesses.

MATYAS SCHIEBENDREIN.

Witnesses:
EMIL STAREK,
FANNIE E. WEBER.